(12) United States Patent
Hayashi

(10) Patent No.: US 6,639,376 B1
(45) Date of Patent: Oct. 28, 2003

(54) FREQUENCY CHARACTERISTIC IDENTIFYING METHOD AND DRIVE CONTROLLING APPARATUS

(75) Inventor: Eiji Hayashi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/254,776

(22) Filed: Sep. 26, 2002

(30) Foreign Application Priority Data

Apr. 24, 2002  (JP) ........................................ 2002-122989

(51) Int. Cl.[7] .............................. G05B 1/06; G05B 11/01
(52) U.S. Cl. ...................... 318/638; 318/560; 318/599; 318/606
(58) Field of Search ................................. 318/560, 638, 318/599, 609, 610, 811, 600, 601, 606; 388/811, 812

(56) References Cited

U.S. PATENT DOCUMENTS 3,742,326 A * 6/1973 Okuda et al. ............... 318/603
4,339,700 A * 7/1982 Desbiens et al. ........... 318/660
4,516,065 A * 5/1985 Ninomiya et al. .......... 318/811

FOREIGN PATENT DOCUMENTS

| JP | 01218389 A | * | 8/1989 | ............. H02P/7/63 |
| JP | 5-19858 | | 1/1993 | |

* cited by examiner

Primary Examiner—Robert E. Nappi
Assistant Examiner—Eduardo Colon-Santana
(74) Attorney, Agent, or Firm—Leydig, Voit & Mayer, Ltd.

(57) ABSTRACT

An instruction value is added to a specific signal to produce an added signal. A servo motor is driven based on this added signal. The response of the motor is measured while the motor is being driven. A characteristic value calculated based on the response is compared with a reference value. When the characteristic value is significantly smaller than the reference value, the amplitude of the specific signal is changed so that the characteristic value converges to the reference value. When the characteristic value has almost converged to the reference value, frequency characteristics can be identified accurately.

14 Claims, 6 Drawing Sheets

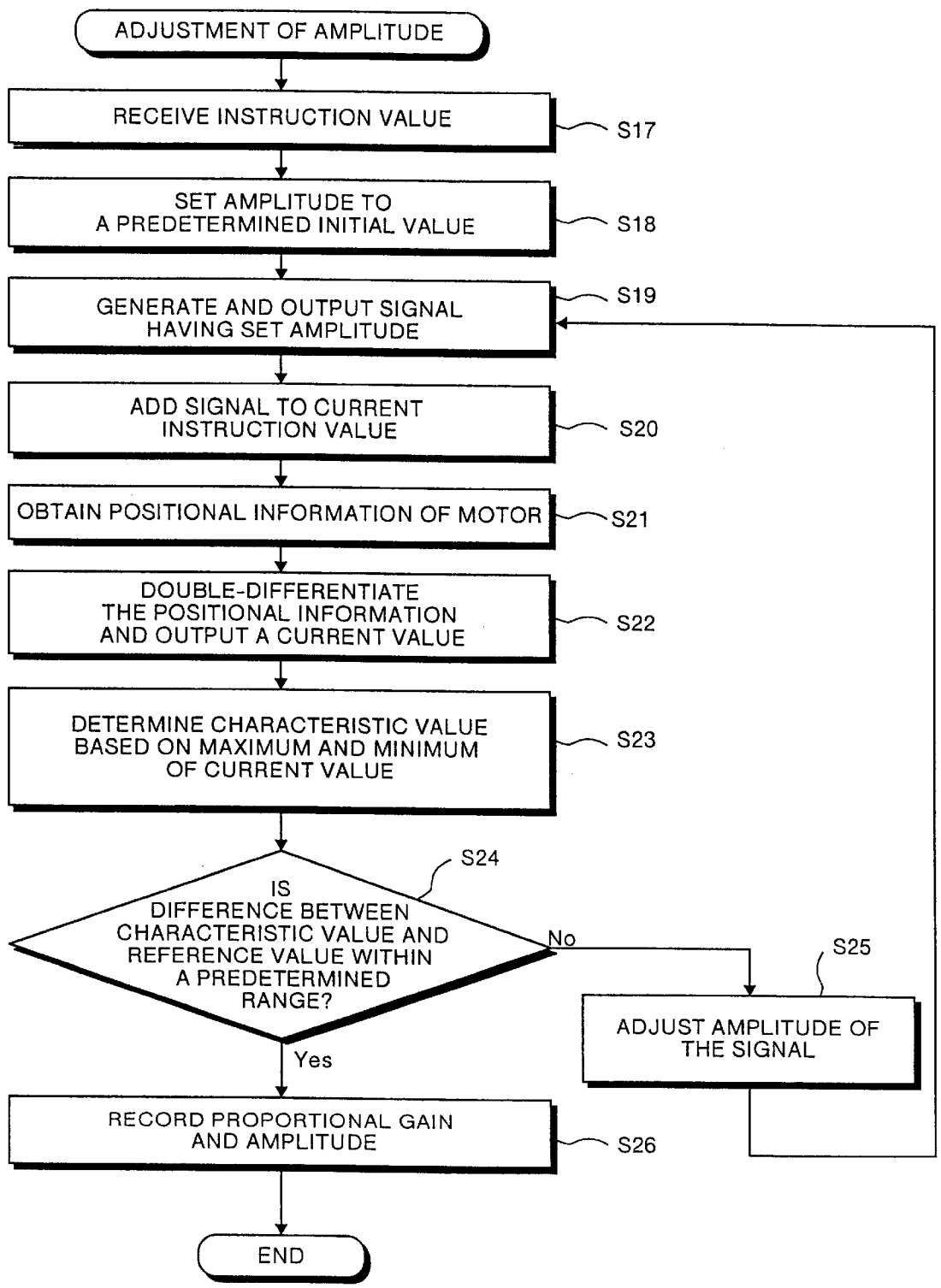

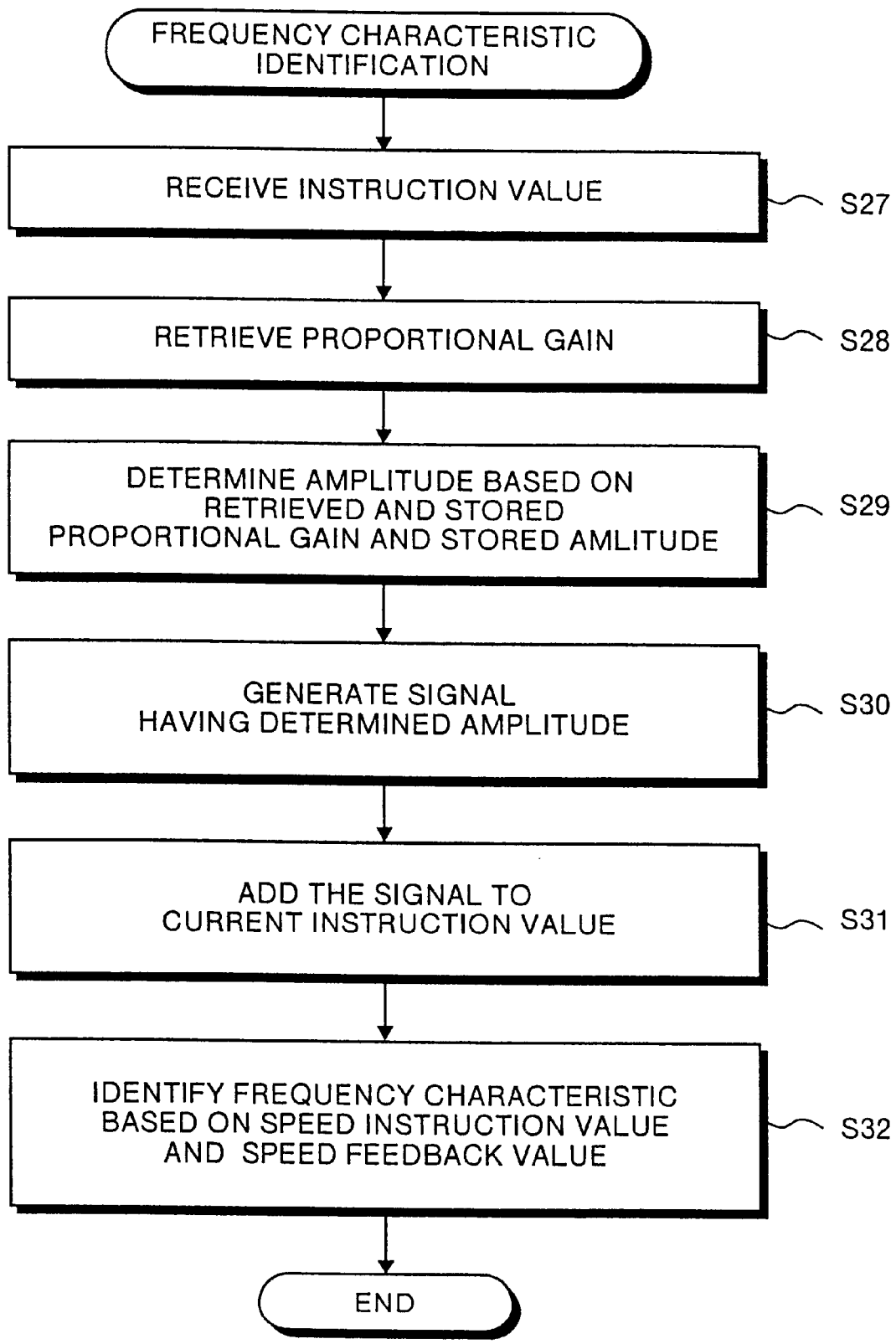

FREQUENCY CHARACTERISTIC IDENTIFYING METHOD AND DRIVE CONTROLLING APPARATUS

BACKGROUND OF THE INVENTION

1) Field of the Invention

The present invention relates to a technology for accurately identifying a frequency characteristic of and controlling a servo motor.

2) Description of the Related Art

A conventional method of identifying a frequency characteristic will be explained here. Such a method has been described in Japanese Patent Application Laid-Open No. 5-19858 titled "servo actuator". The frequency characteristic is identified by adding a scanned alternate signal to the instruction value of a servo system and measuring the response of the feedback control system relative to the signal added.

Precisely, a scanned signal and a speed instruction signal are superimposed and amplitude data is generated from the signals changed from the superimposed signals in a stated procedure. A resonance frequency is calculated based on this amplitude data. The resonance frequency is a frequency at which the rate of change in the amplitude data turns from positive to negative.

In the above-mentioned conventional method of identifying a frequency characteristic, the frequency characteristic is accurately identified by adding an adequate scanned signal to a speed instruction value. In other words, it is impossible to identify the correct frequency characteristic unless the scanned signal added to the speed instruction signal is appropriate.

In the conventional method, moreover, there is no reference on which to determine the amplitude of the scanned signal. Therefore, if the feedback control system is changed, it is not possible to precisely determine amplitude of scanned signal and so the frequency characteristic cannot be identified properly.

On the other hand, even if the feedback system is the same, but certain parameters are changed, then the frequency characteristic shall change. In that case, it is again not possible to determine adequate amplitude and therefore, identification of a frequency characteristic is not accurate.

SUMMARY OF THE INVENTION

The object of the present invention is to provide a method of identifying a frequency characteristic and a drive controlling apparatus that can identify a frequency characteristic accurately.

In the method and apparatus according to the present invention, an instruction value is added to a specific signal to obtain an added signal. A servo motor is driven based on this added signal. A parameter of the motor is measured while the motor is being driven. The parameter may be a response of the motor or positional information of a part of the motor. A characteristic value calculated based on the measured parameter is compared with a reference value. When the characteristic value significantly smaller than the reference value, the amplitude of the specific signal is changed so that the characteristic value converges to the reference value. When the characteristic value has almost converged to the reference value, frequency characteristics can be identified accurately.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 5 is a flow chart showing how the amplitude of the signal is determined, and FIG. 6 is a flow chart describing the process of measuring the frequency characteristic.

DETAILED DESCRIPTIONS

Embodiment(s) of the frequency characteristic identifying method and the drive controlling apparatus according to the present invention will be explained in detail below with reference to the accompanying drawings. It should be noted that the present invention is not limited to the below-explained embodiments.

Figure 1:
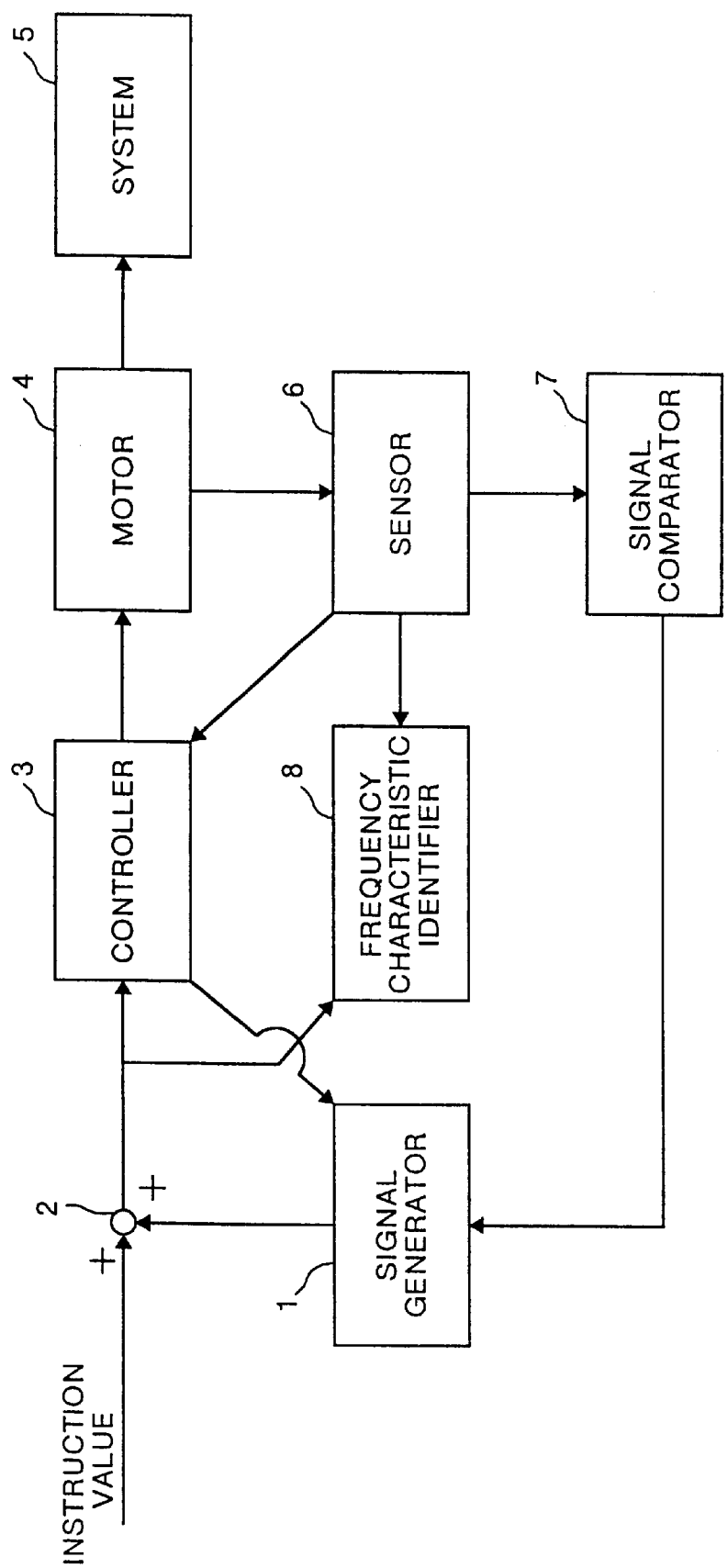
FIG. 1 shows the configuration of the first embodiment of the drive controlling apparatus of the present invention which the frequency characteristic identifying method is realized.

FIG. 1 shows a construction of the first embodiment of the drive controlling apparatus of the present invention on which the frequency characteristic identifying method is realized. In FIG. 1, the reference numeral 1 represents a signal generator, 2 represents an adder, 3 represents a controller, 4 represents a motor, and 5 represents a system that is to be driven. Moreover, the reference numeral 6 represents a sensor, 7 represents a signal comparator, and 8 represents a frequency characteristic identifier.

The drive controlling apparatus shown in FIG. 1 works as follows. The signal generator 1 generates a signal. This signal may be signals that are sequentially output sine waves with different frequencies, or a plurality of superimposed signals having different frequency but same amplitude. The adder 2 adds the signal generated by the signal generator 1 to an instruction value.

The drive controlling apparatus comprises a feedback control system. In this feedback system, the controller 3 outputs an electric current to the motor 4 according to the instruction value and a feedback value. The motor 4 drives the system 5 based on a current output from the controller 3. The current output from the controller 3 is equivalent to the instruction value. The sensor 6 measures a response of the motor 4 and the result is transferred to the controller 3 and the signal comparator 7 as feedback. The sensor 6 will be described in detail later.

The signal comparator 7 extracts a characteristic value based on the result of measurement by the sensor 6. The signal comparator 7 compares the extracted characteristic value with a reference value, and changes the amplitude of the output signal from the signal generator 1 such that the characteristic value converge to the reference value. The frequency characteristic identifier 8 determines the frequency characteristic based on the instruction value and the result of measurement by the sensor 6.

The response of the motor 4 is measured by the sensor 6. However, the construction it is not limited to this. For example, a sensor may be provided with the system 5 to measure the response of the motor 4.

Moreover, the signal comparator 7 and the frequency characteristic identifier 8 perform processing based on the result of measurement by the sensor 6. However, the construction it is not limited to this. For example, the signal comparator 7 and the frequency characteristic identifier 8 may perform the processing by obtaining a value equivalent to the result of measurement by the sensor 6, from the controller 3.

Figure 2:
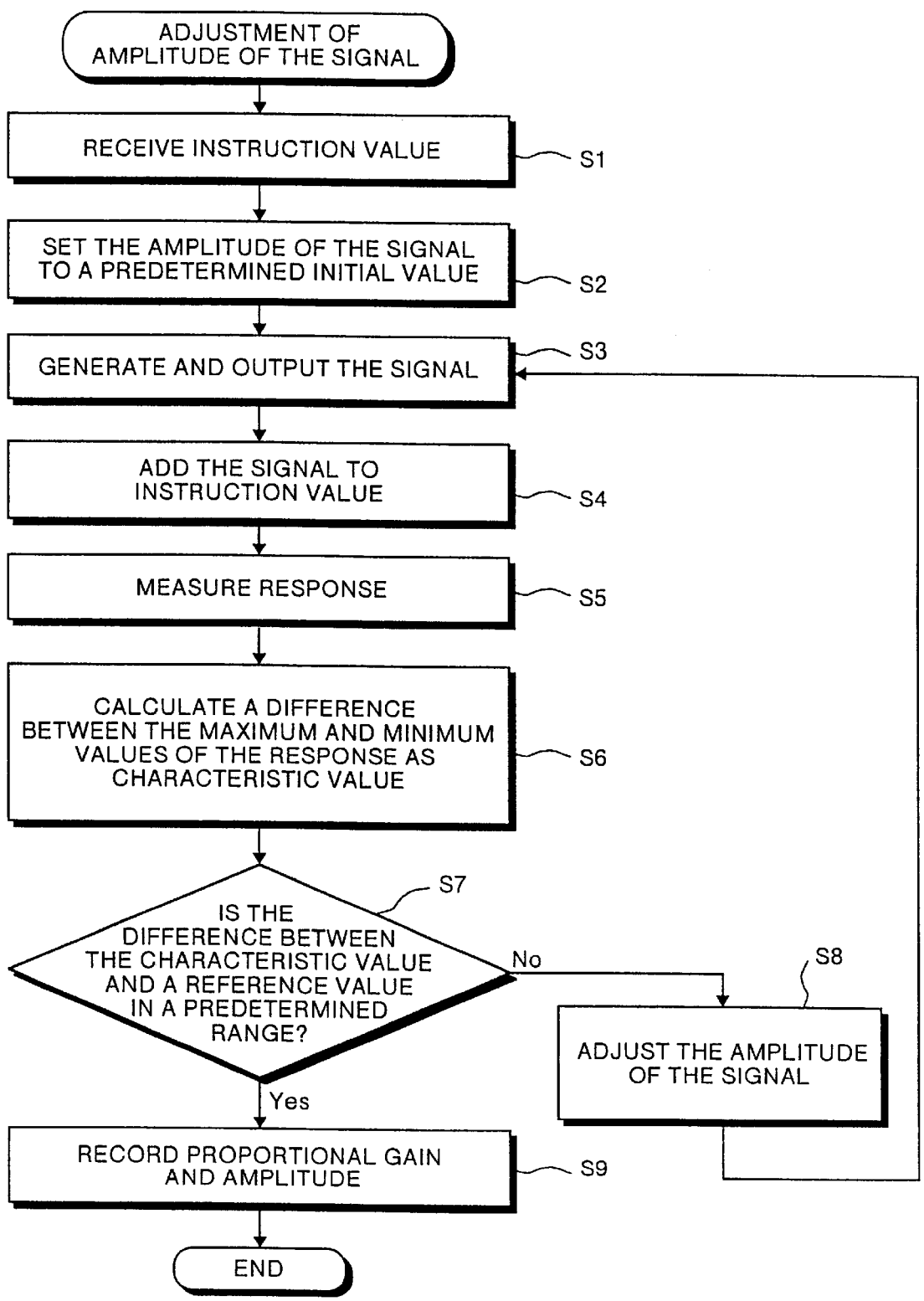
FIG. 2 is a flow chart showing how the amplitude of the signal is determined.

How the amplitude of the signal output from the signal generator 1 is determined is described below. FIG. 2 is a flow chart showing how the amplitude of the signal is determined.

The adder 2 receives an instruction value that has been set to a constant value (step S1). Next, the signal generator 1 sets amplitude of a signal to be output to a predetermined initial value (step S2). Then, the signal generator 1 generates a signal with the amplitude equal to the initial value and outputs the generated signal (step S3). The signal generator 1 generates the signal by sequentially outputting a sine wave with different frequencies, or by superimposing a plurality of signals having different frequency but same amplitude.

The adder 2 adds to the received instruction value the output signal of the signal generator 1 and outputs this result as an instruction value (step S4). The controller 3 controls the motor 4 so as to drive it based on the instruction value output by the adder 2. Also, the sensor 6 measures response of the motor 4 for a given length of time (step S5). The response of the motor 4 may mean a position or speed of the motor, or current flowing in the motor.

The signal comparator 7 stores the motor response measured by the sensor 6 and calculates the difference between the maximum and minimum response. The signal comparator 7 stores the difference as a characteristic value (step S6). The signal comparator 7 then compares the characteristic value and a predetermined reference value, and determines whether the deviation is in a predetermined range (step S7). If the deviation is not in the predetermined range (step S7, No), the signal generator 1 changes the amplitude of the output signal so that the characteristic value converges to the reference value (step S8). These steps from S3 through S8 are repeated in that order until the deviation between the characteristic value and the target value falls with in a predetermined range. On the other hand, when the deviation is within the predetermined range (step S7, Yes), the signal generator 1 decides that the data has been obtained in an amount sufficient enough to measure the frequency characteristic. In this case, the signal generator 1 records the amplitude of the output signal, and a proportional gain ranging from the instruction value received from outside to output value of the controller 3 (step S9).

The difference between maximum and minimum values of motor response is used above as the characteristic value. However, it is not limited to this. A mean square value of response of the motor 4 measured for a given length of time, for instance, may be taken as the characteristic value.

Figure 3:
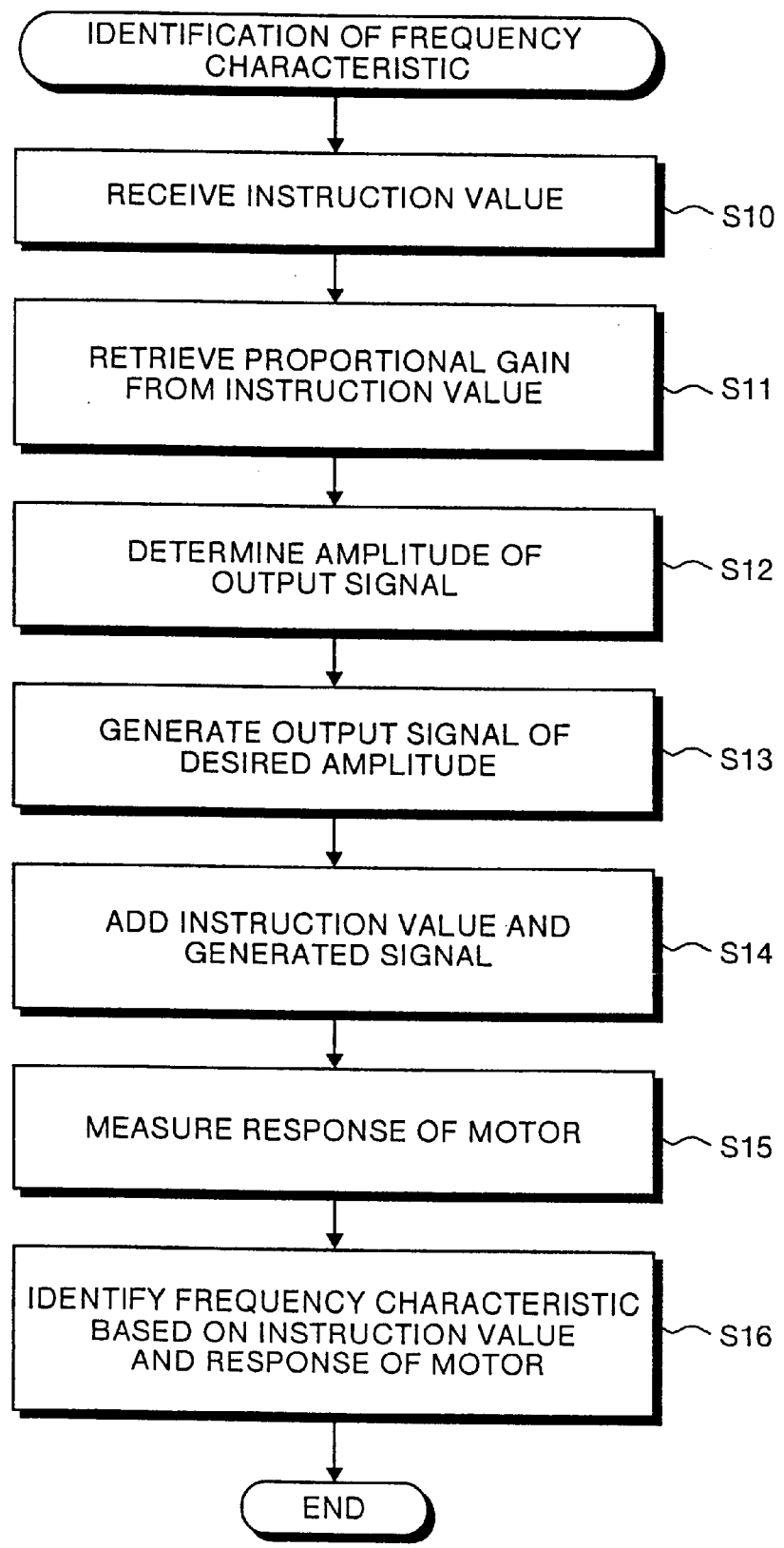
FIG. 3 is a flow chart describing the process of measuring the frequency characteristic.

The process of measuring the frequency characteristic is described below. FIG. 3 is a flow chart describing the process.

To begin with, the adder 2 receives the instruction value which has been set to a constant value (step S10). The signal generator 1 retrieves the proportional gain from the instruction value to the output value of the controller 3 from the controller 3 (step S11). The signal generator 1 then decides the amplitude of the output signal based on the received proportional gain, the memorized (at step S9) proportional gain, and the amplitude of the signal (step S12).

The signal generator 1 determines the amplitude of the output signal as follows. That is, when the proportional gain has changed to a larger value then the output signal having a smaller amplitude is output, and when the proportional gain has changed to a smaller value then the output signal having a larger amplitude is output. For example, the amplitude of output signal K is determined by the following equation (1).

$$K = K1 \times G1/G \quad (1)$$

where G1 and K1 are respectively the proportional gain and amplitude memorized at step S9, and G represents the proportional gain retrieved at step S11.

An alternative method may be to prepare a table according to which the amplitude of the signal is determined such that the amplitude is reduced when the proportional gain becomes larger and the amplitude is increased when the proportional gain becomes smaller.

The signal generator 1 generates the output signal with the amplitude determined at step S12 (step S13) so as to measure the frequency characteristic. This signal can be signals that are sequentially output sine waves with different frequencies, or can be superimposed plurality of signals having different frequency but same amplitude.

The adder 2 adds the output signal of the signal generator 1 to the instructed value (step S14). The controller 3 controls the motor 4 based on the instruction value output from the adder 2. The sensor 6 measures the response of the motor 4 (step S15).

The frequency characteristic identifier 8 receives the instruction value output from adder 2, and identifies the frequency characteristic based on this instruction value and the value of a response of the motor 4 received from the sensor 6 (step S16).

It has been mentioned above that the sensor 6 that is provided with the motor 4 receives the response of motor 4. However, it is not limited to this. It is possible to provide the sensor with the system 5 and measure the response of the motor 4 with this sensor.

As explained above, in the first embodiment, the instruction value obtained from outside is added to a predetermined signal and the servo motor is driven based on the resultant signal. The predetermined signal may be signals that are sequentially output sine waves with different frequencies, or a plurality of superimposed signals having different frequency but same amplitude. Moreover, the characteristic value (the difference between maximum and minimum of response from the servo motor), a calculated value of measured response of the servo motor (a position of the motor, speed, current value and other) and the reference value are compared. When the characteristic value is outside a predetermined range, the amplitude of the signal is changed so the characteristic value converges to the reference value. Such adjustment is executed repeatedly and when the characteristic value is within the predetermined range, it is determined that the sufficient frequency characteristic is identified. By executing these steps, the signal that is best controlled is used to identify frequency characteristic even though the feedback control system is changed.

Also, when sufficient accuracy is gained, amplitude of the signal above and the parameter of the feedback control system are stored. If, for example, the parameter of a feedback control system changes, amplitude of the signal changes to the best value. In case the proportional gain becomes larger, the amplitude of the signal is reduced and when the proportional gain becomes smaller, amplitude of the signal is increased.

Figure 4:
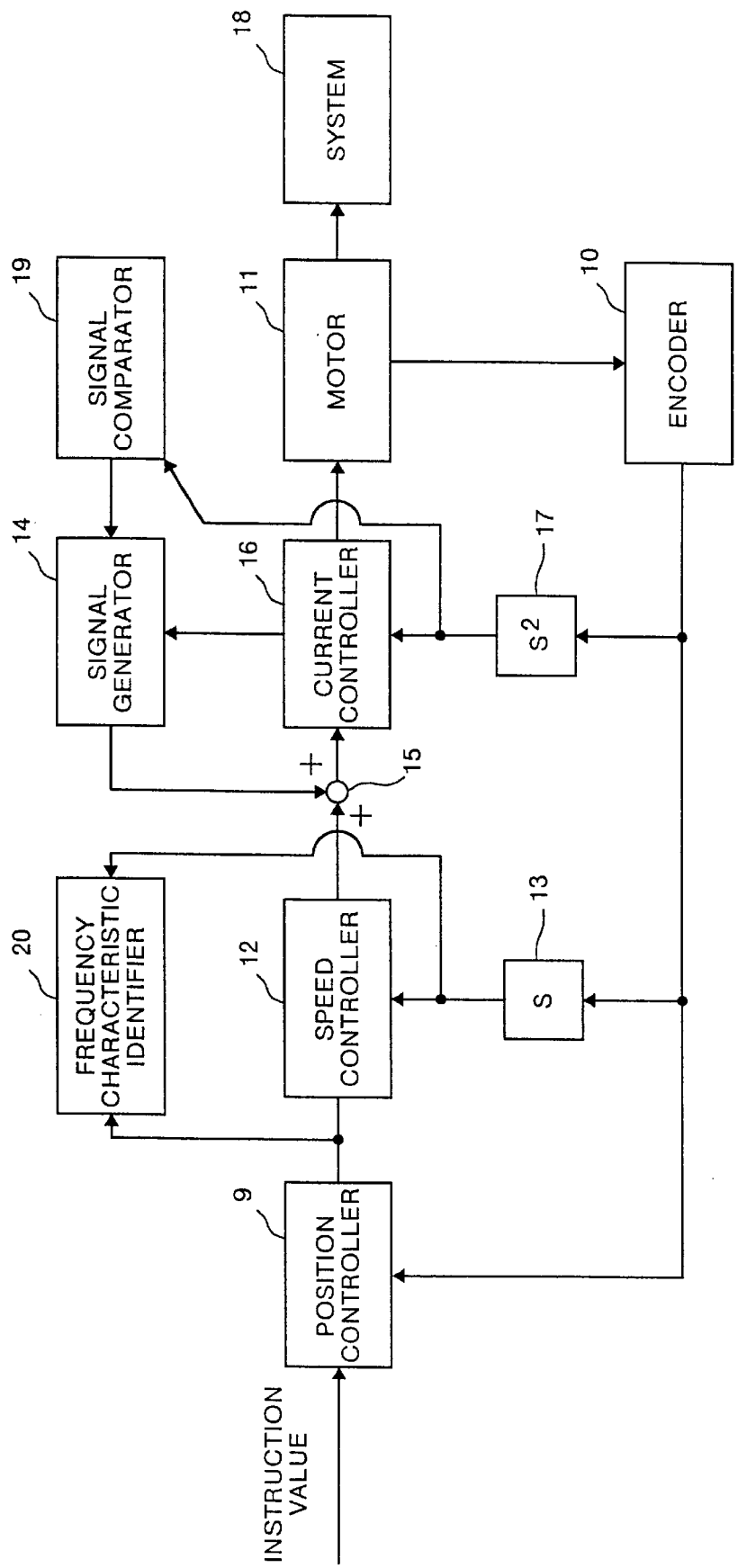
FIG. 4 is the configuration of the second embodiment of the drive controlling apparatus of the present invention on which the frequency characteristic identifying method is realized.

FIG. 4 shows a construction of the second embodiment of the drive controlling apparatus of the present invention. The reference numeral 9 represents a position controller, 10 represents an encoder, 11 represents a motor, 12 represents a speed controller, and 13 represents a primary differentiating apparatus. Moreover, the reference numeral 14 represents a signal generator, 15 represents an adder, and 16 represents a current controller. Moreover, 17 represents a secondary differentiating apparatus, 18 represents a system driven that is to be driven, 19 represents a signal comparator, and 20 represents a frequency characteristic identifier.

The drive controlling apparatus of the second embodiment operates as described below. The position controller 9 constitutes a part of the feedback control system. The position controller 9 generates a speed instruction value based on a position instruction value received from outside and a positional information of the motor 11 received from the encoder 10.

The speed controller 12 also constitutes a part of the feedback controlling system. The speed controller 12 generates and outputs an electric current instruction value. The speed controller 12 generates the electric current instruction value based on the speed instruction value received from the position controller 9 and a signal output from the primary differentiating apparatus 13 that represents differentiation of the positional information of the motor 11 output from the encoder 10. The signal generator 14 generates a signal whose frequency characteristic is to be identified. This signal may be a signal that are sequentially output sine waves with different frequencies, or it may be a signal obtained with any other method. The adder 15 adds the signal output from the signal generator 14 and the current instruction value output from the speed controller 12.

The current controller 16 also constitutes a part of the feedback control system. The current controller 16 outputs a current value based the current instruction value output from the adder 15 and a signal output from the secondary differentiating apparatus 17 that represents double differentiation of the positional information of the motor 11 output from the encoder 10. The motor 11 is driven based on the current value output from current controller 16. The motor in turn drives the system 18. The encoder 10 is provided with the motor 11. The encoder 10 measures the position (or a parameter that is equivalent to the position) of the motor 11.

The signal comparator 19 extracts a characteristic value from the signal output from the secondary differentiating apparatus 17. The signal comparator 19 adjusts the amplitude of the signal generated by the signal generator 14 so that the characteristic value converges to the reference value. The frequency characteristic identifier 20 identifies frequency characteristic from the speed instruction value output from the position controller 9 and the signal output from the primary differentiating apparatus 13.

The amplitude of the signal generated in the signal generator 14 is adjusted with a process that is described below. FIG. 5 is a flow chart of this process.

To begin with, the position controller 9 receives the instruction value that has been set to a constant value (step S17). The generator 14 sets an amplitude of the signal to be output a signal with the set amplitude (step S19). Here, the signal generate 14 generates the since signal with different frequencies sequentially output or, the signal composed by superimposing a plurality of frequencies with the same amplitude.

The adder 15 adds the signal output from the signal generator 14 to the current instruction value output from the speed controller 12 and then outputs the result to the current controller 16 (step S20). The encoder 10 obtains positional information of the motor 11 for a given length of time when the adder 15 has performed the addition (step S21).

The secondary differentiating apparatus 17 double-differentiates the signal output from the encorder 10 and outputs the result in the form of a current value (step S22). The signal comparator 19 calculates a characteristic value based on a difference between a maximum and a minimum of the current value output from the secondary differentiating apparatus 17 (step S23). Moreover, the signal comparator 19 checks whether difference between the characteristic value and a predetermined reference value is within a predetermined range (step S24). If the difference between the characteristic value and the reference value is not within the predetermined range (i.e. the characteristic value and the reference value are close) (step S24, Yes), then the signal comparator 19 records the amplitude of the signal generated by the signal generator 14 as well as the proportional gain from the current instruction value of the current controller 16 (step S26).

It has been mentioned above that the characteristic value calculated from the maximum and minimum values of the current (representing positional information of the motor 11). However, it is not limited to this. For example, the characteristic value may be calculated from a mean square of the current within a given length of time.

How the frequency characteristic is determined will now be described. FIG. 6 is a flow chart that shows how the frequency characteristic is determined.

To begin with, the position controller 9 receives the instruction value that has been set to a constant value (step S27). The signal generator 14 retrieves the proportional gain from the current instruction value to the output value of the current controller 16 (step S28). Then, the signal generator 14 determines the amplitude based on the retrieved and the recorded the proportional gain and the recorded output amplitude (step S29). The signal generated 14 generates a signal having the determined amplitude (step S30). Precisely, the signal generated 14 decreases the amplitude when the proportional gain has increase, and increased the amplitude when the proportional gain has decreased.

The adder 15 adds the signal generated by the signal generator 14 to the current instruction value output from the speed controller 12 to output a current instruction value (step S31). The current controller 16 drives the motor 11 based on the current instruction value output from adder 15.

The frequency characteristic identifier 20 identifies the frequency characteristic of a speed loop. The frequency characteristic identifier 20 identifies the frequency characteristic based on the speed instruction value output from the position controller 9, and the signal ("speed feedback value") output from the primary differentiating apparatus 13 (step S32).

The method explained above is not limited to this alone. For example, the output signal of the signal generator 14 can be added to the position instruction value or the speed instruction value. Moreover, it is possible to identify the frequency characteristic of the positional loop from the positional instruction value and positional feedback value and it is also possible to identify the frequency characteristic of the current loop from the current instruction value and current feedback value. It is also possible to use a sensor in the system 18 instead of the encoder 10 to identify the frequency characteristic.

In the second embodiment, the current instruction value obtained from the positional instruction value is added to a predetermined signal and the motor is driven based on the result of this addition. The predetermined signal may be signals that are sequentially output sine waves with different frequencies, or a plurality of superimposed signals having different frequency but same amplitude. Moreover, the characteristic value, response of the servo motor is measured, and the characteristic value obtained based on this response is compared with the reference value. The response can be the speed feedback value, the position feedback value, or the current feedback value. The characteristic value is the difference between the maximum and minimum values of the response. If the difference between the characteristic value and the reference value is not within a predetermined range, the amplitude of the signal is changed. This process is repeated until the characteristic value converges to the reference value. As a result, accurate frequency characteristic is identified even if the feedback control system changes.

When it is decided that the frequency characteristic can be obtained with sufficient accuracy, then the amplitude and the parameters of the feedback control system are stored. As a result, if, for example, the parameters of the feedback control system have undergone a change, an optimal value of the amplitude can be calculated using the stored values. For example, if the proportional gain has increased the amplitude is reduced, and if the proportional gain has decreased the amplitude is increased. As a result, frequency characteristic can be identified using a signal that is optimal even though there is a change in the feedback control system.

As explained above, the method and the apparatus according to the present invention make it possible to identify frequency characteristic accurately.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A frequency characteristic identifying method executable in a drive controlling apparatus that controls driving of a servo motor, the method comprising:

receiving an instruction value;

generating as a signal one of (i) a sequential signal including sequential sine waves with different frequencies and identical amplitudes, and (ii) a superimposed signal including a plurality of superimposed signals having different frequencies and identical amplitudes;

adding the instruction value to the signal generated to produce an added signal;

driving a servo motor based on the added signal;

measuring a parameter of the servo motor while the servo motor is being driven;

calculating a characteristic value based on the parameter measured;

calculating a difference between the characteristic value and a reference value;

determining whether the difference is within a range; and when the difference is not within the range, changing amplitude of the signal generated so that the characteristic value converges to the reference value.

2. The frequency characteristic identifying method according to claim 1 further comprising, when the characteristic value is at least equal to the reference value, storing the amplitude of the signal generated.

3. The frequency characteristic identifying method according to claim 1, further comprising:

calculating a proportional gain based on the instruction value;

storing at least a previous proportional gain and a current proportional gain;

comparing the proportional gains stored; and when the proportional gains stored are not equal to each other, changing the amplitude of the signal generated.

4. The frequency characteristic identifying method according to claim 3, comprising, when changing the amplitude of the signal generated, reducing the amplitude of the signal generated when the current proportional gain is larger than the previous proportional gain, and increasing the amplitude of the signal generated when the current proportional gain is smaller than the previous proportional gain.

5. The frequency characteristic identifying method according to claim 1, further comprising storing parameters of the servo motor and obtaining the characteristic value as a difference between a maximum value and a minimum value of the parameters stored.

6. The frequency characteristic identifying method according to claim 1, further comprising storing parameters of the servo motor acquired and obtaining the characteristic value as a mean square root of the parameters stored.

7. The frequency characteristic identifying method according to claim 1, wherein parameters of the servo motor are any one of position of the servo motor, speed of the servo motor, and current flowing in the servo motor.

8. A drive controlling apparatus controlling a servo motor comprising:

a signal generator which generates as a signal one of (i) a sequential signal including sequential sine waves with different frequencies and identical amplitudes, and (ii) a superimposed signal including a plurality of superimposed signals having different frequencies and identical amplitudes;

an adder which adds the signal generated by the signal generator to an instruction value to produce an added signal;

a controller which controls a servo motor based on the added signal;

a sensor which measures a parameter of the servo motor; and a signal comparator which calculates a characteristic value based on the parameter calculates a difference between the characteristic value and a reference value, determines whether the difference is within a range, and outputs whether the difference is within the range to the signal generator, wherein the signal generator changes amplitude of the signal generated when the difference is outside the range, so that the characteristic value converges to the reference value.

9. The drive controlling apparatus according to claim 8, further comprising a storing unit that stores the amplitude of the signal generated by the signal generator when the signal comparator determines that the characteristic value is at least equal to the reference value.

10. The drive controlling apparatus according to claim 8, further comprising a storing unit; wherein the controller calculates a proportional gain based on the instruction value;

the storing unit stores at least a previous proportional gain and a current proportional gain;

the signal comparator compares the proportional gains stored in the storing unit; and the signal generator changes the amplitude of the generated signal when the signal comparator determines that the proportional gains stored are not equal to each other.

11. The drive controlling apparatus according to claim 10, wherein, when changing the amplitude of the signal generated, the signal generator reduces the amplitude of the signal generated when the current proportional gain is larger than the previous proportional gain, and increases the amplitude of the signal generated when the current proportional gain is smaller than the previous proportional gain.

12. The drive controlling apparatus according to claim 8, further comprising a storing unit which stores parameters of the servo motor acquired, wherein the signal comparator calculates the characteristic value as a difference between a maximum value and a minimum value of the parameters stored in the storing unit.

13. The drive controlling apparatus according to claim 8, further comprising a storing unit which stores parameters of the servo motor acquired, wherein the signal comparator calculates the characteristic value as a mean square root of the parameters stored in the storing unit.

14. The drive controlling apparatus according to claim 8, wherein the parameter of the servo motor is any one of position of the servo motor, speed of the servo motor, and current flowing in the servo motor.

* * * * *